US008843752B1

(12) United States Patent
Priyadarshi et al.

(10) Patent No.: US 8,843,752 B1
(45) Date of Patent: Sep. 23, 2014

(54) MULTI-FACTOR DEVICE AUTHENTICATION

(75) Inventors: Shaiwal Priyadarshi, San Diego, CA (US); Nicholas Paul Wehr, San Diego, CA (US); Roland P. Osborne, San Diego, CA (US)

(73) Assignee: Prima Cimema, Inc., Carlsbad, CA (US)

( * ) Notice: Subject to any disclaimer, the term of this patent is extended or adjusted under 35 U.S.C. 154(b) by 0 days.

(21) Appl. No.: 13/357,000

(22) Filed: Jan. 24, 2012

Related U.S. Application Data

(60) Provisional application No. 61/435,515, filed on Jan. 24, 2011.

(51) Int. Cl.
*H04L 9/32* (2006.01)

(52) U.S. Cl.
USPC .............................. 713/176; 713/168; 726/7

(58) Field of Classification Search
None
See application file for complete search history.

(56) References Cited

U.S. PATENT DOCUMENTS

| | | | |
|---|---|---|---|
| 5,781,534 A * | 7/1998 | Perlman et al. | 370/248 |
| 6,738,427 B2 | 5/2004 | Zetts | |
| 6,914,637 B1 | 7/2005 | Wolf et al. | |
| 7,096,481 B1 | 8/2006 | Forecast et al. | |
| 7,565,649 B2 | 7/2009 | Sasabe | |
| 7,571,471 B2 | 8/2009 | Sandhu et al. | |
| 7,680,929 B1 * | 3/2010 | Lyon | 709/224 |
| 7,734,045 B2 | 6/2010 | Sandhu et al. | |
| 7,739,744 B2 | 6/2010 | Burch et al. | |
| 7,774,824 B2 | 8/2010 | Ross | |
| 8,316,421 B2 * | 11/2012 | Etchegoyen | 726/4 |
| 8,521,131 B1 * | 8/2013 | Ramalingam et al. | 455/410 |
| 2003/0005287 A1 * | 1/2003 | Wray et al. | 713/155 |
| 2005/0278775 A1 | 12/2005 | Ross | |
| 2007/0100771 A1 * | 5/2007 | Eckleder et al. | 705/67 |
| 2007/0130468 A1 * | 6/2007 | Cunningham et al. | 713/176 |
| 2007/0200918 A1 | 8/2007 | Kwon et al. | |
| 2007/0203850 A1 | 8/2007 | Singh et al. | |
| 2007/0220575 A1 | 9/2007 | Cooper et al. | |
| 2007/0220594 A1 | 9/2007 | Tulsyan | |
| 2007/0234408 A1 | 10/2007 | Burch et al. | |
| 2007/0258585 A1 | 11/2007 | Sandhu et al. | |
| 2007/0258594 A1 | 11/2007 | Sandhu et al. | |
| 2008/0126591 A1 | 5/2008 | Kwon | |
| 2008/0271104 A1 | 10/2008 | Perry et al. | |
| 2008/0289030 A1 | 11/2008 | Poplett | |
| 2008/0307515 A1 | 12/2008 | Drokov et al. | |

(Continued)

OTHER PUBLICATIONS

Dekun Zou, Nicolas Prigent, and Jeffrey Bloom, Compressed Video Stream Watermarking for Peer-to-Peer Based Content Distribution Network, Thomson Corporate Research, <ULR: http://www.videotechresearch.com/Jeffrey_Bloom>, Proceedings of the IEEE International Conference on Multimedia and Expo (ICME) 2009.

(Continued)

*Primary Examiner* — Jung Kim
*Assistant Examiner* — Robert Leung
(74) *Attorney, Agent, or Firm* — Barceló, Harrison & Walker, LLP

(57) ABSTRACT

A method and system for the secure delivery of data to a remote device that has been registered and which requires authentication through the use of a multifactor signature profile is disclosed, and in particular according to certain disclosed aspects, a method and system for ensuring that an authenticated remote device remains authenticated.

14 Claims, 3 Drawing Sheets

(56) References Cited

U.S. PATENT DOCUMENTS

| | | |
|---|---|---|
| 2009/0012901 A1 | 1/2009 | Singh et al. |
| 2009/0037388 A1 | 2/2009 | Cooper et al. |
| 2009/0116703 A1 | 5/2009 | Schultz |
| 2009/0141810 A1 | 6/2009 | Tabatabai et al. |
| 2009/0220075 A1 | 9/2009 | Sidhu et al. |
| 2009/0260043 A1 | 10/2009 | Tatsuta et al. |
| 2010/0132019 A1 | 5/2010 | Hardt |
| 2010/0153451 A1 | 6/2010 | Delia et al. |
| 2010/0202609 A1 | 8/2010 | Sandhu et al. |
| 2010/0269147 A1 | 10/2010 | Zetterower et al. |

OTHER PUBLICATIONS

CEA (Consumer Electronics Association) Standard, A DTV Profile for Uncompressed High Speed Digital Interfaces, CEA-861-E, <ULR: http://www.CE.org>, Date: Mar. 2008.

Display-Port (Digital Display Interface, developed by: VESA (Video Electronics Standards Association), title: DisplayPort Technical Overview, <URL: http://www.displaysearch.com>, Date: May 2010.

* cited by examiner

MULTI-FACTOR DEVICE AUTHENTICATION

CROSS-REFERENCE TO RELATED APPLICATIONS

This application claims the benefit of Provisional Application Ser. No. 61/435,515, filed on Jan. 24, 2011, the contents of which are herein incorporated by reference in their entirety.

BACKGROUND OF THE DISCLOSURE

1. Field of the Disclosure

The disclosure relates generally to a method and system for effecting an initial authentication of a device to which data may be securely distributed, in part by recording and measuring parameters that are not under the control of said device, including the installed environment in which said device is placed, and for verifying that the authentication of said device remains valid by monitoring changes to said measured parameters.

2. General Background

Device authentication is one known tool that is used for network security purposes. Device authentication may be described as based on storing and presenting credentials to obtain access to a network. Credentials may be based on an account/password combination, or on a digital authentication certificate, such as with the International Telecommunication Union (ITU) X.509 standard recommendation. One known problem with an account/password combination and with the digital certificate methods of authentication is that credentials based on these mechanisms may be presented from a device or system that is not the true owner of the credentials, yet may nevertheless be authenticated as valid, thus improperly granting access to the presenting device. For example, the known good credentials of a system could be transported to a rogue system that would be able to use the credentials to authenticate itself. Thus, from an authentication perspective, nothing prevents theft or other falsification of the credentials, because standard device authentication only evaluates the validity of the credentials being presented, without being able to determine whether the presenter should be permitted to use the credentials.

Thus, automatically identifying and authenticating an electronic device in a secure manner typically involves assigning the device an identity certificate, such as an X.509 certificate. However, as described above, the use of such a certificate on its own may provide security challenges, such as ensuring that a particular device's certificate is not copied or moved to a counterfeit or rogue device, or the device itself has not been moved from the intended environment to another, unintended and possibly untrusted environment. Accordingly, it is desirable to address the limitations in the art. For example, there exists a need to provide for a system and method for the secure delivery of content, which allows for secure delivery of content to a secure device, and which does not solely rely on mechanisms such as X.509 certificates to ensure authentication. As another example, there exists a need for the ability to verify that the networked environment of an authenticated device to which data may be securely distributed has not been modified without authorization, in part by recording and measuring parameters that are not under the control of said device.

SUMMARY

Systems and methods for effecting multi-factor device authentication are disclosed. In certain embodiments, systems and methods for authenticating a device are disclosed, which may include the steps of recording an initial multi-factor installation signature associated with the device, determining a subsequent multi-factor installation signature associated with the device, comparing the subsequent multi-factor installation signature against the initial multi-factor installation signature to define an installation signature change profile, and generating an alarm signal indicating whether said installation signature change profile satisfies a change profile tolerance criterion. In some embodiments, the initial multi-factor installation signature may include a network address or a geographical location indicator associated with the media playback device. In some embodiments, a movement indicator or network topology information may be used as part of an installation signature. Other aspects and advantages of various aspects of the present invention can be seen upon review of the figures and of the detailed description that follows.

BRIEF DESCRIPTION OF THE DRAWINGS

By way of example, reference will now be made to the accompanying drawings, which are not to scale.

DETAILED DESCRIPTION

Figure 1:
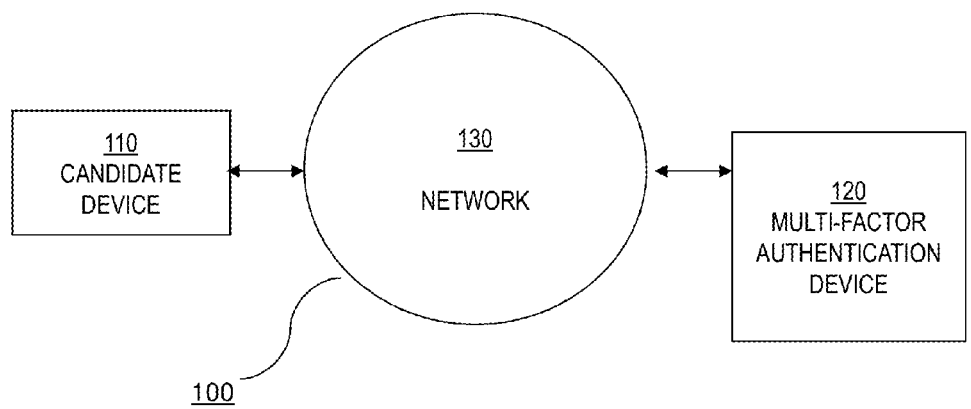
FIG. 1 illustrates an exemplary networked environment and its relevant components according to aspects of the present invention.

Those of ordinary skill in the art will realize that the following description of the present invention is illustrative only and not in any way limiting. Other embodiments of the invention will readily suggest themselves to such skilled persons, having the benefit of this disclosure. Reference will now be made in detail to specific implementations of the present invention as illustrated in the accompanying drawings. The same reference numbers will be used throughout the drawings and the following description to refer to the same or like parts.

Further, certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C# (CSharp), Perl, Ada, Python, Pascal, SmallTalk, FORTRAN, assembly language, and the like, may be used to implement aspects of the present invention. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of functions.

The term "machine-readable medium" should be understood to include any structure that participates in providing data which may be read by an element of a computer system. Such a medium may take many forms, including but not limited to, non-volatile media, volatile media, and transmission media. Non-volatile media include, for example, optical or magnetic disks and other persistent memory. Volatile media include dynamic random access memory (DRAM) and/or static random access memory (SRAM). Transmission media include cables, wires, and fibers, including the wires that comprise a system bus coupled to processor. Common forms of machine-readable media include, for example, a floppy disk, a flexible disk, a hard disk, a magnetic tape, any other magnetic medium, a CD-ROM, a DVD, any other optical medium.

FIG. 1 depicts an exemplary networked environment 100 in which systems and methods, consistent with exemplary embodiments, may be implemented. As illustrated, networked environment 100 may include a device 110 to be authenticated, which could be a multimedia playback device, a multifactor authentication device 120, and a network 130. The exemplary simplified number of candidate devices 110, multifactor authentication devices 120, and networks 130 illustrated in FIG. 1 can be modified as appropriate in a particular implementation. In practice, there may be additional candidate devices 110, multifactor authentication devices 120, and/or networks 130.

A candidate device 110 may include a client entity. An entity may be defined as a device, such as a computer or another type of computation or communication device, a thread or process running on one of these devices, and/or an object executable by one of these devices. In one embodiment, candidate device 110 may include a personal computer, a laptop or notebook or netbook computer, a wireless device (e.g., a cellular telephone, a personal digital assistant (PDA), tablet computer, etc.), and/or any other type of device with which a multimedia session may be established. In addition, a candidate device 110 may include other types of telephone and/or video conferencing devices. For example, a candidate device 110 may also include a POTS telephone, a Session Initiation Protocol (SIP) telephone, an IP Multimedia Subsystem (IMS) client, a set-top box that provides voice and/or video sessions, and/or other types of telephone/video conferencing devices. In certain embodiments, a candidate device 110 may include any suitable form of multimedia playback device, including, without limitation, a cable or satellite television set-top box, a DVD player, a digital video recorder (DVR), or a digital audio/video stream receiver, decoder, and player.

In certain embodiments, a candidate device 110 may include one or more authentication devices or identifiers, such as a microphone, a camera, a webcam, a fingerprint scanner, an eye scanner, an accelerometer or other movement detector, a geopositional satellite (GPS) sub-system or other geographic location identification capabilities, a network address or topology indicator. Alternatively, or in addition to the foregoing, depending on the specific requirements of each particular implementation, a candidate device 110 may include one or more authentication devices or identifiers based on electromagnetic scanners or sensors. For example, a pyranometer may be used to measure solar irradiance and thereby to correlate expected exposures to help fixate position based on expected vs. actual sunrise and/or sunset time at a given location. As other examples, gamma ray, x-ray, and/or ultraviolet radiation sensors may be used to capture and measure invisible environmental wavelengths that may be persistent in a given environment. As another example, radio frequency strength sensors may be used to detect and compare the signal strength of one or more radio frequency broadcasts (such as "ham radio" signals or other signals) over time, which should stay within a permitted threshold if a candidate device 110 stays within its expected range of locations. Authentication methodologies and suitable for each particular implementation based on any combination of the foregoing may readily be applied by persons skilled in the art. A candidate device 110 may connect to network 130 via wired and/or wireless connections.

Multifactor authentication device 120 may include an entity capable of determining and/or setting and/or verifying the authentication status of a candidate device 110. As indicated above, an entity may be defined as a device, such as a computer or another type of computation or communication device, a thread or process running on one of these devices, and/or an object executable by one of these devices. In one embodiment, multifactor authentication device 120 may initiate and/or terminate multimedia sessions with candidate device 110. Multifactor authentication device 120 may connect to network 130 via wired and/or wireless connections.

Network 130 may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, a satellite-based network, and/or another type of suitable network, depending on the requirements of each particular implementation.

One or more components of networked environment 100 may perform one or more of the tasks described as being performed by one or more other components of networked environment 100.

Figure 2:
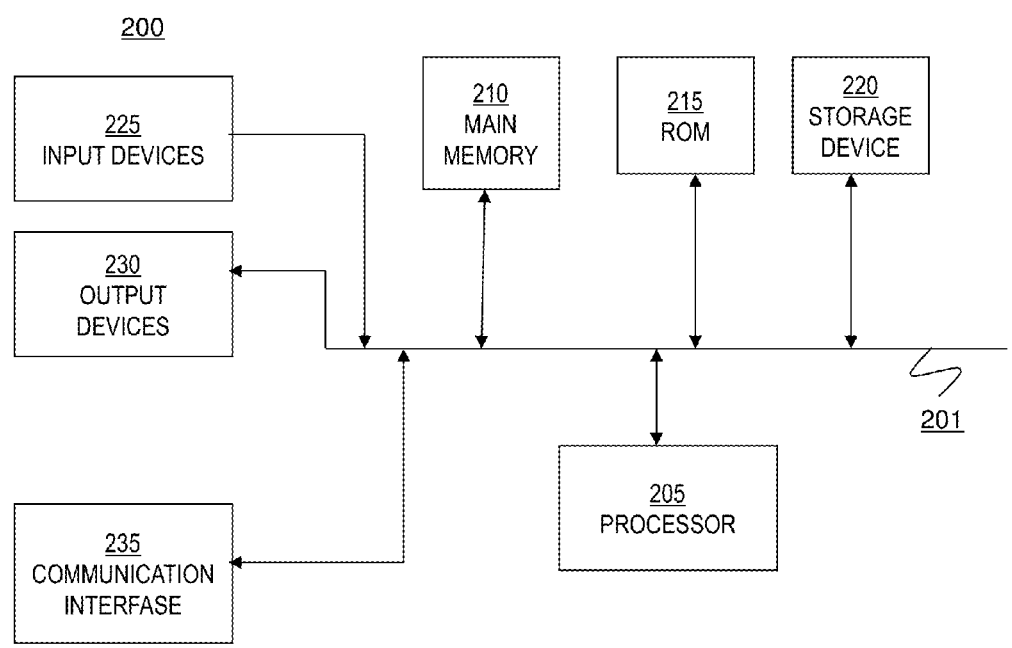
FIG. 2 is an exemplary block diagram of a computing device that may be used to implement aspects of certain embodiments of the present invention.

FIG. 2 is an exemplary diagram of a computing device 200 that may be used to implement aspects of certain embodiments of the present invention, such as aspects of candidate device 110 or of multifactor authentication device 120. Computing device 200 may include a bus 201, one or more processors 205, a main memory 210, a read-only memory (ROM) 215, a storage device 220, one or more input devices 225, one or more output devices 230, and a communication interface 235. Bus 201 may include one or more conductors that permit communication among the components of computing device 200.

Processor 205 may include any type of conventional processor, microprocessor, or processing logic that interprets and executes instructions. Main memory 210 may include a random-access memory (RAM) or another type of dynamic storage device that stores information and instructions for execution by processor 205. ROM 215 may include a conventional ROM device or another type of static storage device that stores static information and instructions for use by processor 205. Storage device 220 may include a magnetic and/or optical recording medium and its corresponding drive.

Input device(s) 225 may include one or more conventional mechanisms that permit a user to input information to computing device 200, such as a keyboard, a mouse, a pen, a stylus, handwriting recognition, voice recognition, biometric mechanisms, and the like. Output device(s) 230 may include one or more conventional mechanisms that output information to the user, including a display, a projector, an A/V receiver, a printer, a speaker, and the like. Communication interface 235 may include any transceiver-like mechanism that enables computing device/server 200 to communicate with other devices and/or systems. For example, communication interface 235 may include mechanisms for communicating with another device or system via a network, such as network 130 as shown in FIG. 1.

As will be described in detail below, computing device 200 may perform operations based on software instructions that may be read into memory 210 from another computer-readable medium, such as data storage device 220, or from another device via communication interface 235. The software instructions contained in memory 210 cause processor 205 to perform processes that will be described later. Alternatively, hardwired circuitry may be used in place of or in combination with software instructions to implement processes consistent with the present invention. Thus, various implementations are not limited to any specific combination of hardware circuitry and software.

A web browser comprising a web browser user interface may be used to display information (such as textual and graphical information) on the computing device 200. The web browser may comprise any type of visual display capable of displaying information received via the network 130 shown in FIG. 1, such as Microsoft's Internet Explorer browser, Netscape's Navigator browser, Mozilla's Firefox browser, PalmSource's Web Browser, Google's Chrome browser or any other commercially available or customized browsing or other application software capable of communicating with network 130. The computing device 200 may also include a browser assistant. The browser assistant may include a plug-in, an applet, a dynamic link library (DLL), or a similar executable object or process. Further, the browser assistant may be a toolbar, software button, or menu that provides an extension to the web browser. Alternatively, the browser assistant may be a part of the web browser, in which case the browser would implement the functionality of the browser assistant.

The browser and/or the browser assistant may act as an intermediary between the user and the computing device 200 and/or the network 130. For example, source data or other information received from devices connected to the network 130 may be output via the browser. Also, both the browser and the browser assistant are capable of performing operations on the received source information prior to outputting the source information. Further, the browser and/or the browser assistant may receive user input and transmit the inputted data to devices connected to network 130.

Similarly, the embodiment of the present invention described herein is discussed in the context of the global data communication network commonly referred to as the Internet. Those skilled in the art will realize that embodiments of the present invention may use any other suitable data communication network, including without limitation direct point-to-point data communication systems, dial-up networks, personal or corporate Intranets, proprietary networks, or combinations of any of these with or without connections to the Internet.

In certain embodiments, aspects of the present invention provide a method, system and apparatus for the secure delivery of audiovisual content to a remote device connected to a network that is registered and identified by a signature using a multi-factor security approach to device authentication and verification that provides levels of security that typically may require human intervention to accomplish.

Figure 3:
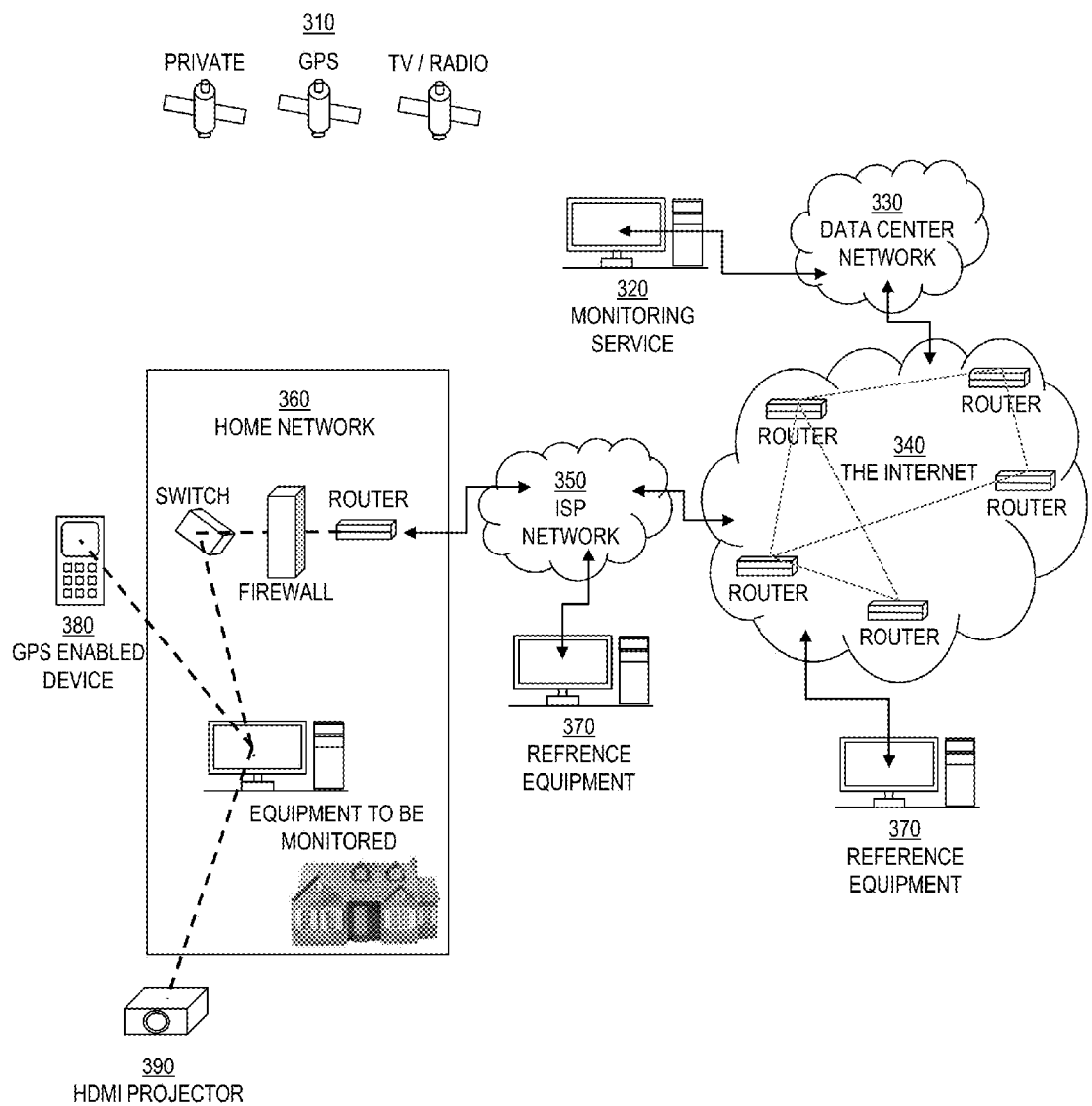
FIG. 3 is an exemplary block diagram of a networked system environment that may be used to implement aspects of certain embodiments of the present invention.

FIG. 3 depicts an exemplary block diagram of a networked system environment that may be used to implement aspects of certain embodiments of the present invention. Signals and information being transmitted from or received at various satellite-based systems such as GPS, TV/radio, or private systems (310) may be incorporated into the communication paths at any suitable location. A monitoring service (320) may coupled to any suitable network such as the Internet (340) via a data center network (330). A candidate device to be monitored (shown within home network 360) may use an assigned X.509 certificate to securely identify itself. The first time the candidate device registers with an authentication device, the authentication device also records the public Internet IP address used by the candidate device, and from that information determines an approximate geographical fix for the candidate device and then begins a process to capture the initial characteristics of the network path between the authentication device and the candidate device. In this step, the authentication device measures and records characteristics such as the Internet Service Provider (ISP) network 350, intermediate devices' network protocol implementation characteristics, the round-trip communications latency, the number of intermediate network router hops and potentially other relevant network-path-related characteristics. This information is used to form an installation signature associated with the candidate device. It should be noted that many of the factors or parameters listed above are typically not under the control of the candidate device, and that any subset of these parameters may be used according to aspects of the present invention, depending on the requirements of each particular implementation.

Furthermore, during the initial registration phase, a phone number or International Mobile Equipment Identity (IMEI) number or other identifier of a GPS-enabled, cellular network device (see, e.g., item 380 in FIG. 3) may also be provided. This cellular phone may be used to finalize a candidate device's registration by a user using the phone to access a link on a candidate device registration web-portal. This final step may provide a more accurate GPS fix or other location identifier associated with the candidate device.

These sets of information may be used to determine the physical location of a candidate device, and may further couple that location with attributes of the network used to communicate with the device. Whenever the installation signature needs to be verified, the candidate device may prompt or instruct a user to access a candidate device registration web-portal using a GPS-enabled cellular phone (see, e.g., item 380 in FIG. 3). If the GPS location from the cellular device does not match the location when initially registered, then users may be required to speak to a system operator to manually confirm their identity and explain the reasons why the location of the candidate device has changed.

Other factors that may be determined, recorded, and tracked as part of the multi-factor authentication method and system according to aspects of the present invention include:

A GPS satellite and/or receiver to provide accurate physical location definition;

An embedded motion sensor, such as an accelerometer;

Publicly visible Internet address (IP Address) to provide a logical association between a network and an account holder;

Information provided by commercial "IP to location" services, GPS data and local government housing data;

Ethernet MAC addresses of devices in a portion of a network path between a candidate device and an authentication server;

The route that data takes to travel between a candidate device and an authentication server, such as the information that may be provided using the UNIX tool "traceroute" or the Windows tool "tracert.exe";

Any auxiliary equipment that interfaces with candidate devices may also be used to generate the installation signature by obtaining the auxiliary equipment's unique identifiers (for example, HDMI projectors (see, e.g., item 390 in FIG. 3) (and other devices) that are HDCP-compliant can present a unique device ID that may be used to form a portion of an installation's signature);

Signal strength as parameter from different sources;

Different signal types (cell phones, broadcast radio/TV, etc.)/embedded IDs in received signals/satellite broadcasts, neighboring smart meter beacons, etc.;

Local ISP info;

Local cable TV program guide (or actual, captured video sequences) as a way of validating location and ISP;

Reference monitored equipment (see, e.g., items 370 in FIG. 3) that is installed and managed by a trusted authority at any location and is used to gather metrics related to behavior seen on actual monitored pieces of equipment (candidate devices) that are near the reference equipment;

Seismic sensors, which may be confirmed through motion-detection circuitry within a candidate device;

Weather and other published environmental characteristics (e.g., temperature, barometric pressure, etc.);

Internal device hardware signatures from integrated circuits and/or subsystems within a candidate device (hard disk drive IDs, RAID-array IDs, etc.);

Internal device software signatures associated with a candidate device, such as information provided by device drivers, the operating system, installed applications, etc.;

User information stored in a candidate device;

Physical tilt information from a tilt sensor in a device; and/or

Compass heading information from a magnetic sensor in a device.

As has already been mentioned, many of the factors or parameters listed above are typically not under the control of the candidate device, and any subset of these parameters may be used according to aspects of the present invention, depending on the requirements of each particular implementation.

Figure 4:
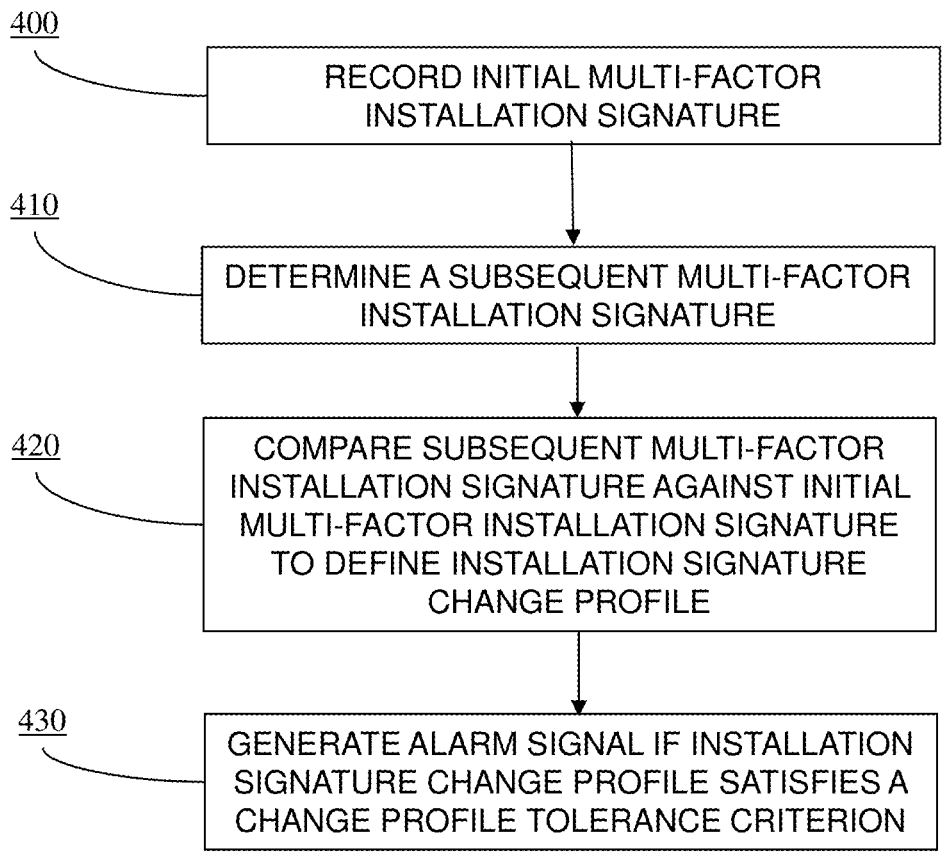
FIG. 4 depicts a flow chart relating to multifactor device authentication according to an embodiment of the present invention.

FIG. 4 depicts a flow chart relating to multi-factor device authentication according to certain embodiments of the present invention. At step 400, an initial multi-factor installation signature associated with a candidate device such as a media playback device is recorded. The installation signature may be based on factors such as a network address associated with the candidate device, a geographical location indicator based on such a network address, any other geographical location indicator associated with the candidate device, a movement indicator associated with the candidate device (such as an indicator based on accelerometers, seismometers, or any other suitable sensor), a network topology signature associated with one or more parameters of a network path between the candidate device and an authentication server, or any other suitable combination of factors or variables. The complexity of the algorithms used to determine an installation signature may be determined by those skilled in the art, depending on the particular requirements of each implementation.

At step 410, a subsequent multi-factor installation signature associated with the candidate device is determined. For example, the initial multi-factor installation signature may be recorded during initial installation of a candidate device, while a subsequent multi-factor installation signature may be determined at a later time, such as when a candidate device attempts to access or play back information that is intended to be used only by properly authenticated candidate devices.

At step 420, the subsequent multi-factor installation signature is compared against the initial multi-factor installation signature to define an installation signature change profile. For example, an installation change profile may include information relating to any change of physical location of a candidate device, or to any change in the network topology of a network path between a candidate device and an authentication server or device.

At step 430, an alarm signal is generated indicating whether said installation signature change profile satisfies a change profile tolerance criterion. For example, if the installation signature change profile indicates that the location of a candidate device has changed by more than a predetermined distance, and/or that the network topology has changed, an alarm signal may be generated. Such an alarm signal may be used to prevent unauthorized playback or other use of protected content or information by a candidate device. Alternatively, without limitation as to the possible implementation variations, the alarm signal may be generated only if the change profile indicates that no change threshold has been exceeded, in which case the alarm signal may be used to authorize playback or other use of protected content or information by a candidate device.

While the above description contains many specifics and certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art, as mentioned above. The invention includes any combination or subcombination of the elements from the different species and/or embodiments disclosed herein.

We claim:

1. A computerized method for authenticating a media playback device across a computer network, comprising the steps of:

determining, at a multi-factor authentication device capable of communicating with said media playback device across said computer network, characteristics of the environment associated with said media playback device based on one or more electromagnetic sensors integrated into said media playback device and capable of measuring and sending data to said multi-factor authentication device across said computer network;

forming an initial multi-factor installation signature based on a result of said determining step;

recording said initial multi-factor installation signature on a device accessible across said computer network;

determining, at said multi-factor authentication device, a subsequent multi-factor installation signature based on data received from said one or more electromagnetic sensors;

comparing said subsequent multi-factor installation signature against said initial multi-factor installation signature to define an installation signature change profile; and generating an alarm signal at said multi-factor authentication device, indicating whether said installation signature change profile satisfies a change profile tolerance criterion, wherein said one or more electromagnetic sensors comprise a pyranometer and said characteristics of the environment associated with said media playback device comprise solar irradiance data.

2. The method of claim 1, wherein said initial multi-factor installation signature comprises a X.509 certificate.

3. The method of claim 1, wherein said initial multi-factor installation signature comprises a network address associated with said media playback device.

4. The method of claim 3, wherein said initial multi-factor installation signature comprises geographical location based on said network address.

5. The method of claim 1, wherein said initial multi-factor installation signature comprises a movement indicator.

6. The method of claim 1, wherein said initial multi-factor installation signature comprises network topology data associated with a network path between said media playback device and a media content provider.

7. The method of claim 1, wherein said one or more electromagnetic sensors comprise a radio signal strength sensor.

8. A system for authenticating a media playback device across a computer network, comprising:

a multi-factor authentication device coupled to said media playback device across said computer network, comprising means for determining characteristics of the environment associated with said media playback device based on one or more electromagnetic sensors integrated into said media playback device and capable of measuring and sending data to said multi-factor authentication device across said computer network, means for forming an initial multi-factor installation signature based on a result of said determining means, means for recording said initial multi-factor installation signature on a device accessible across said computer network, means for determining, at said multi-factor authentication device, a subsequent multi-factor installation signature based on data received from said one or more electromagnetic sensors, means for comparing said subsequent multi-factor installation signature against said initial multi-factor installation signature to define an installation signature change profile, and means for generating an alarm signal at said multi-factor authentication device, indicating whether said installation signature change profile satisfies a change profile tolerance criterion, wherein said one or more electromagnetic sensors comprise a pyranometer and said characteristics of the environment associated with said media playback device comprise solar irradiance data.

9. The system of claim 8, wherein said initial multi-factor installation signature comprises a X.509 certificate.

10. The system of claim 8, wherein said initial multi-factor installation signature comprises a network address associated with said media playback device.

11. The system of claim 10, wherein said initial multi-factor installation signature comprises geographical location based on said network address.

12. The system of claim 8, wherein said initial multi-factor installation signature comprises a movement indicator.

13. The system of claim 8, wherein said initial multi-factor installation signature comprises network topology data associated with a network path between said media playback device and a media content provider.

14. The system of claim 8, wherein said one or more electromagnetic sensors comprise a radio signal strength sensor.

* * * * *